United States Patent
Gostling

[11] 3,880,533
[45] Apr. 29, 1975

[54] SCAFFOLD AND LIKE STRUCTURES

[75] Inventor: Peter Eric Gostling, Sutton Coldfield, England

[73] Assignee: C. Evans & Sons Limited, Ilford, Essex, England

[22] Filed: Oct. 10, 1973

[21] Appl. No.: 405,089

[30] Foreign Application Priority Data
Oct. 13, 1972 United Kingdom............... 47336/72

[52] U.S. Cl.................. 403/189; 403/49; 403/409
[51] Int. Cl............................................... F16b 7/00
[58] Field of Search............ 403/49, 199, 187, 241, 403/245, 256, 409, 374, 189, 230; 182/179

[56] References Cited
UNITED STATES PATENTS

| | | | |
|---|---|---|---|
| 1,674,734 | 6/1928 | Maynes | 182/179 UX |
| 3,179,212 | 4/1965 | Gostling | 403/49 X |
| 3,273,921 | 9/1966 | Young et al. | 403/49 |
| 3,300,236 | 1/1967 | Sauls | 403/49 |
| 3,420,557 | 1/1969 | Francis et al. | 182/179 X |

FOREIGN PATENTS OR APPLICATIONS
1,163,532  9/1969  United Kingdom................ 403/189

Primary Examiner—Andrew V. Kundrat
Attorney, Agent, or Firm—Melville, Strasser, Foster & Hoffman

[57] ABSTRACT

A locking assembly for use in interconnecting two members in builders scaffolding, which comprises a channel-shaped element adapted to be fixed to one of said two members, and a wedge member mounted on said channel-shaped element to engage the base wall of said channel-shaped element and a part of the other of said two members, means being provided to hold said wedge member captive in said channel-shaped element, and to retain said wedge member in an inoperative position.

9 Claims, 6 Drawing Figures

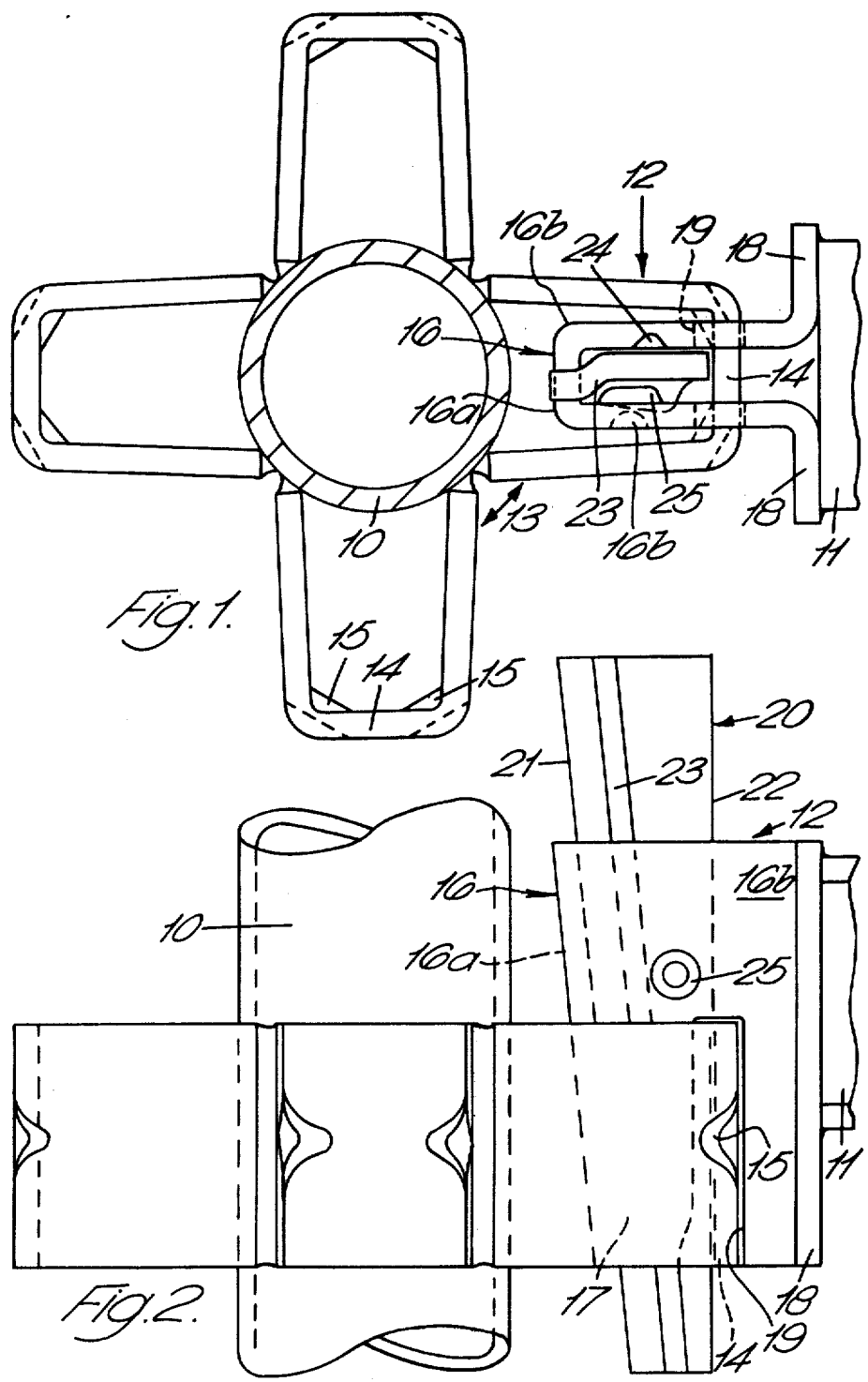

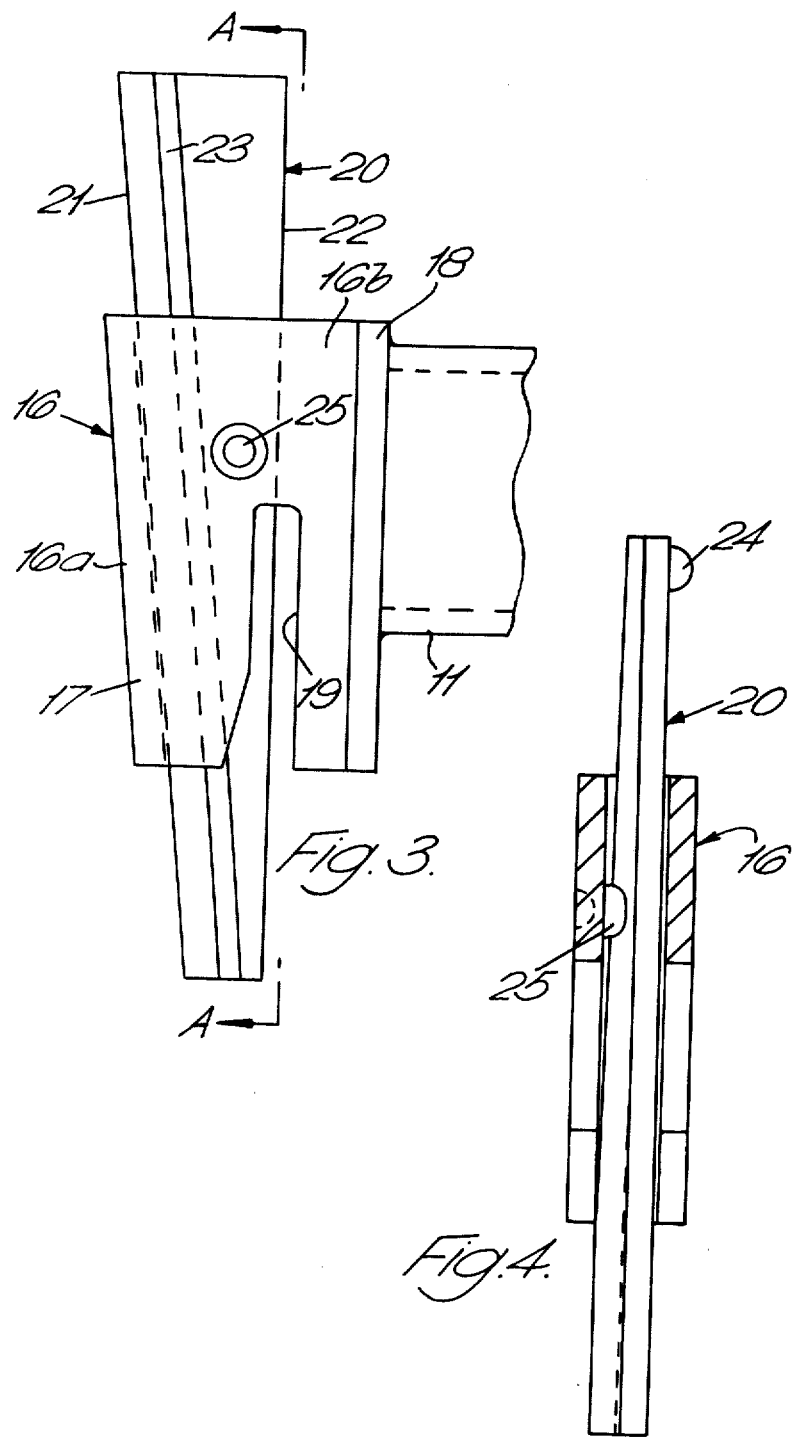

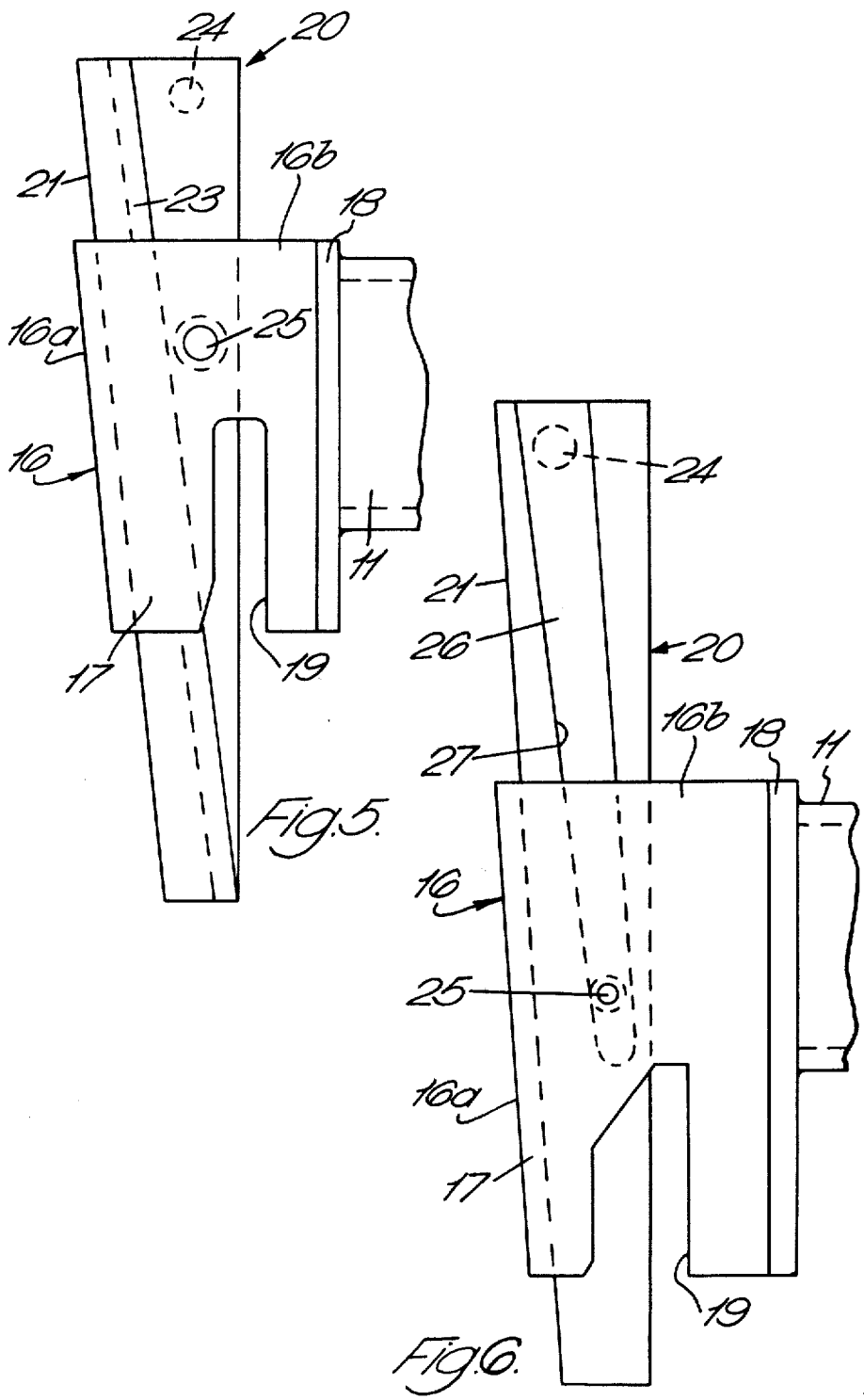

SCAFFOLD AND LIKE STRUCTURES

This invention relates generally to builders scaffolding of the kind comprising upright supports or standards and cross members which are interconnected to form a rigid structure. The term "cross members" includes horizontally extending ledgers, horizontally extending transoms, diagonal and other bracing members, and other members such as outrigger brackets which extend transversely to the upright supports or standards, and which are adapted to connect together, or be connected to, the upright supports or standards.

The present invention is concerned with a locking assembly for use in interconnecting the cross members with the upright supports, and for use in interconnecting other members, such as two upright supports, in scaffolding of the aforementioned kind.

The term "builders scaffolding" is intended to include scaffolding for access purposes where the standards are of one diameter, and also to cover scaffolding for propping purposes where the standards or other upright supports such as puncheon members are of the same, or of a different, diameter as that used for access scaffolding.

It is among the objects of the present invention to provide a simple, robust and relatively inexpensive locking assembly for use in builders scaffolding as hereinbefore referred to.

According to the present invention, there is provided a locking assembly for use in interconnecting two members in builders scaffolding of the kind hereinbefore referred to, which comprises a channel-shaped element the ends of the side walls of which are provided to be directly or indirectly fixed to one of two members to be interconnected and the base wall of which is inclined relative to said ends of the side walls, and a wedge member mounted within the walls of the channel-shaped element to co-act with the base wall and, when in use and in its operative position, with a part of the other of said two members to be interconnected, wherein the wedge member is held captive in the channel-shaped element and is arranged and constructed so that it can be moved from its operative position into, and be retained in, an inoperative position.

The invention is illustrated by way of example in the accompanying drawings in which:

FIG. 1 is a sectional plan view of a connector assembly incorporating one form of locking means according to the invention, FIG. 2 is a side elevation corresponding to FIG. 1, FIG. 3 is a side elevation of one part of the assembly of FIGS. 1 and 2, FIG. 4 is a sectional end elevation on the line A—A of FIG. 3, and FIGS. 5 and 6 are views similar to FIG. 3 showing modifications.

Referring to the drawings, there is shown a tubular upright support member 10 which, in use, will form one of the tubular support members of a scaffold structure. Also shown is a tubular cross member 11 which, in use, will form one of the horizontal members of the structure. Whilst the cross member 11 is shown as being tubular, it will be understood that it can be of any other section, for instance, inverted T-section so that it can provide support for planks. The members 10 and 11 are interconnected by a connector assembly 12.

The assembly 12 comprises two components fixed to the members 10 and 11 respectively, the component on the member 10 comprising a channel-shaped element 13 having its base wall 14 disposed parallel to the axis of the member 10. As shown in FIG. 1, four such channel-shaped elements 13 are provided spaced about the support member 10. The channel-shaped elements 13 are welded to the member 10 and, intermediate their ends, gussets 15 are formed between the side walls and the base wall 14. The gussets 15 provide added strength to the members 13 and conveniently are formed by a pressing operation.

The component which is secured to the cross member 11 is referred to as a hook member 16 and includes a hook portion 17 which, in use, is accommodated within the channel-shaped element 13. The hook member 16 is formed as a channel having side walls 16b the ends of which are outwardly turned and define wings 18 which are secured to the member 11 by welding. The plane of the wings 18, and thus of the ends of the side walls 16b, lies perpendicular to the end edges of the member 16. The base wall 16a of the channel is inclined relative to the plane of the wings 18 and the width of the channel, measured between the outer surfaces of the walls 16b thereof, is less than the internal width of the channel-shaped element 13.

Formed in the walls 16b of the channel 16 are aligned slots 19. The slots 19 extend upwardly from the lower and narrower end edge of the channel 16 and the surfaces of the slots 19 which are nearer to the member 11 are disposed substantially parallel to the plane of the wings 18. The width of the slots 19 is greater than the thickness of the base wall 14 of the channel-shaped element 13 and the lower portions of the surfaces of the slots remote from the member 11 flare outwardly to facilitate inter-engagement of the two components.

The hook element 16 mounts a wedge 20 having wedging surfaces 21, 22 for co-operation with the base wall 16a of the channel 16 and the base wall 14 of the channel-shaped element 13 respectively. When the hook member 16 is engaged with the channel element 13, the wedge 20 is tapped in a downward direction towards its operative position and the effect of this is to draw the surfaces of the slots 19 nearest to the member 11 into firm engagement with the outer surface of the base wall 14 of the channel element 13 and thereby, the support member 10 and cross member 11 are held in engagement with each other.

The thickness of the plate from which the wedge 20 is formed is less than the distance between the inner surfaces of the side walls of the channel 16. However, as seen in FIGS. 1 and 4, the wedge member 20 is joggled or cranked to provide an intermediate longitudinal bend indicated at 23. The line of the bend 23 extends parallel to the surface 21 but, as seen in FIG. 4, the overall thickness of the wedge is less at its upper end than at its lower end. The effect of this is that the wedge 20 can be retained in its upper or inoperative position by interference with the inner surfaces of the side walls of the channel 16. The wedge is prevented from falling out of the channel by a projection 24 at the upper end thereof, and the wedge is guided in its movement by means of a projection 25 extending inwardly from one of the side walls 16b of the channel 16, the projection 25 co-operating with the surface defined by the intermediate bend 23.

With reference to FIG. 5, the wedge 20 has a uniform overall thickness throughout its length, but in order to provide for retention of the wedge in the upper or inoperative position, the line of the intermediate bend 23 is disposed at an angle to the surface 21, the distance between the line and surface being greatest at the bottom of the wedge. The projection 25 is again provided and serves to locate the wedge but, in addition, as the wedge is driven upwardly, the projection engages with the surface defined by the bend 23 and a wedging action is created which retains the wedge in its upper or inoperative position.

A modified form of wedge 20 is seen in FIG. 6. In this arrangement the wedge 20 is provided with a dished zone or longitudinally extending recess 26 which is produced by a pressing operation. The boundary edge 27 of the dished zone is inclined relative to the surface 21 of the wedge so that, when the wedge is moved upwardly, the projection 25 will move into wedging engagement with the edge 27 thereby to retain the wedge in its upper inoperative position. The projection 24 is again provided to prevent the wedge falling from the hook member 16.

Although the invention has been described with reference to interconnecting a cross member 11 with an upright support member 10 by providing the channel-shaped element 16 as a hook member, it will be understood that it is not limited in this respect since, for other purposes, the channel-shaped element 16 may not be in the form of a hook member. Thus, where the locking assembly is used for interconnecting end-to-end two upright support members 10, the channel-shaped element 16 may form part of a strap which is fixed to one member 10 to overlap the other member 10.

Furthermore, the channel-shaped element 16 may be fixed in position without the use of the wings 18, or by other means similar to the wings 18, such as arcuate extensions which conform to the peripheral surface of the member to which they are to be attached.

What I claim is:

1. A locking assembly for use in interconnecting two members in builders scaffolding, which comprises a channel-shaped element having a base wall and side walls the ends of said side walls being fixable to one of said two members to be interconnected, and said base wall being inclined relative to said ends of said side walls, and a tapered wedge member mountable within said walls of said channel-shaped element to co-act with said base wall and, when in use and in its operative position, with a part of the other of said two members to be interconnected, said wedge member comprising a plate having first and second oppositely disposed wedging surfaces said first wedging surface co-acting with said base wall of said channel-shaped element and said second wedging surface co-acting with said part of the other of said two members to be interconnected, wherein said wedge member is of cranked formation to define an intermediate longitudinal bend lying parallel to said first wedging surface, said wedge member further being tapered from one end to the other to present an increased thckness at one end therof whereby, in use, movement of said wedge member from an operative positon into an inoperative position is such that said end of increased thickness engages the adjacent surfaces of said side walls of said channel-shaped element and thereby causes said wedge member to be retained in said inoperative position.

2. An assembly as claimed in claim 1, in which said wedge member is provided at its broadest end with a projection which is engageable with said channel-shaped element to prevent said wedge member from falling out of said channel-shaped element.

3. An assembly as claimed in claim 1, in which said channel-shaped element is in the form of a hook member.

4. A locking assembly for use in interconnecting two members on builders scaffolding, which comprises a channel-shaped element having a base wall and side walls the ends of said side walls being fixable to one of said two members to be interconnected, and said base wall being inclined relative to said ends of said side walls, and a tapered wedge member mountable within said walls of said channel-shaped element to co-act with said base wall and, when in use and in its operative position, with a part of the other of said two members to be interconnected, said wedge member comprising a plate having first and second oppositely disposed wedging surfaces said first wedging surface co-acting with said base wall of said channel-shaped element and said second wedging surface co-acting with said part of the other of said two members to be interconnected, wherein said wedge member is of cranked formation to define a longitudinal intermediate bend, the line of said bend being inclined relative to said first wedging surface of said wedge member, one of said side walls of said channel-shaped element being provided with a projection which, as said wedge member is moved towards its inoperative position, engages with said intermediate bend of said wedge member to retain said wedge member in said inoperative position.

5. As assembly as claimed in claim 4, in which said wedge member is provided at its broadest end with a projection engageable with said channel-shaped element to prevent said wedge member from falling out of said channel-shaped element.

6. As assembly as claimed in claim 4, in which said channel-shaped element is in the form of a hook member.

7. A locking assembly for use in interconnecting two members in builders scaffolding, which comprises a channel-shaped element having a base wall and side walls the ends of said side walls being fixable to one of said two members to be interconnected, and said base wall being inclined relative to said ends of said side walls, and a tapered wedge member mountable within said walls of said channel-shaped element to co-act with said base wall and, when in use and in its operative position, with a part of the other of said two members to be interconnected, said wedge member comprising a plate having first and second oppositely disposed wedging surfaces said first wedging surface co-acting with said base wall of said channel-shaped element and said second wedging surface co-acting with said part of the other of said two members to be interconnected, wherein said wedge member is formed with a longitudinally extending recess, a longitudinal boundary edge of said recess defining the limits of an abutment which surface is inclined relative to said first wedging surface of said wedge member, and one of said side walls of said channel-shaped element being provided with a projection engageable with said abutment surface to retain said wedge member in an inoperative position.

8. An assembly as claimed in claim 7, in which said wedge member is provided at its broadest end with a projection which is engageable with said channel-shaped member to prevent said wedge member from falling out of said channel-shaped member.

9. An assembly as claimed in claim 7, in which said channel-shaped element is in the form of a hook member.

* * * * *